(12) United States Patent
Kobayashi et al.

(10) Patent No.: US 6,206,572 B1
(45) Date of Patent: Mar. 27, 2001

(54) BEARING DEVICE

(75) Inventors: Yasuhiro Kobayashi, Kashihara; Takeshi Takahashi, Kashiba; Yasuo Takamura, Yamatokoriyama; Shinji Matsue, Kashiwara, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/243,791

(22) Filed: Feb. 3, 1999

(30) Foreign Application Priority Data

Feb. 5, 1998 (JP) .................................................. 10-024419

(51) Int. Cl.⁷ ...................................................... F16C 33/12
(52) U.S. Cl. ............................ 384/278; 384/114; 384/905
(58) Field of Search .................................... 384/114, 115, 384/278, 398, 905, 912; 359/200

(56) References Cited

U.S. PATENT DOCUMENTS

| 3,359,047 | * | 12/1967 | Andersen ............................... 384/278 |
| 4,797,009 | * | 1/1989 | Yamazaki .......................... 384/115 X |
| 5,606,448 | * | 2/1997 | Suzuki et al. ..................... 384/115 X |
| 5,647,672 | * | 7/1997 | Fukutani .............................. 384/100 |
| 5,664,889 | * | 9/1997 | Gustafson ....................... 384/278 X |
| 5,793,561 | * | 8/1998 | Ibaraki et al. .................... 384/114 X |
| 5,924,798 | * | 7/1999 | Usui ..................................... 384/114 |
| 5,998,898 | * | 12/1999 | Fukutani et al. ................. 384/114 X |
| 6,010,246 | * | 1/2000 | Gomyo et al. ........................ 384/115 |

FOREIGN PATENT DOCUMENTS

| 63-235719 | * | 9/1988 | (JP) | ....................................... 384/115 |
| 5-118322 | * | 5/1993 | (JP) | ....................................... 384/115 |
| 5-149326 |   | 6/1993 | (JP) | . |

OTHER PUBLICATIONS

Askeland. D.R. The Science and Engineering of Materials. Third Edition. Boston, PWS Publishing, 1994. p. 705. TA403.A74.*

* cited by examiner

Primary Examiner—Charles A. Marmor
Assistant Examiner—Ankur Parekh
(74) Attorney, Agent, or Firm—Jacobson, Price, Holman & Stern, PLLC

(57) ABSTRACT

It is an object of the invention to provide a bearing device in which the bearing performance is not lowered even when the temperature is changed.

In order to attain the object, the bearing device has a shaft and a sleeve. The shaft is made of stainless alloyed steel and has dynamic pressure generating grooves of a herringbone-like shape. The sleeve consists of the body made of a copper alloy, and an electroless nickel plated layer which covers the whole surface of the body. The electroless nickel plated layer has a coefficient of thermal expansion which is smaller than that of the body made of a copper alloy. The coefficient of thermal expansion of the shaft made of stainless alloyed steel is smaller than that of the body of the sleeve made of a copper alloy. When the temperature is raised, the electroless nickel plated layer suppresses the amount of thermal expansion of the body.

2 Claims, 2 Drawing Sheets

BEARING DEVICE

BACKGROUND OF THE INVENTION

The invention relates to a bearing device which can be suitably used in an environment in which the temperature largely changes.

Conventionally, a bearing device is used in which a shaft having dynamic pressure grooves is fitted into a sleeve made of a copper alloy.

In such a bearing device of the prior art, the sleeve and the shaft are made of materials of different kinds and have different coefficients of thermal expansion. Therefore, such a bearing device has a problem in that, when the temperature is changed, the gap between the sleeve and the shaft is largely changed and the supporting performance due to a dynamic pressure is lowered.

SUMMARY OF THE INVENTION

Consequently, it is an object of the invention to provide a bearing device in which the bearing performance is not lowered even when the temperature is changed.

In order attain the object, the bearing device is a bearing device in which a supporting portion and a supported portion are rotatably fitted to each other, and characterized in that one of the supporting portion and the supported portion has a surface layer on a surface of a body of the one portion, the surface layer having a coefficient of thermal expansion which is smaller than a coefficient of thermal expansion of the body, and the coefficient of thermal expansion of the body is larger than a coefficient of thermal expansion of the other one of the supporting portion and the supported portion.

In the bearing device, the coefficient of thermal expansion of the body of one of the supporting portion and the supported portion is larger than that of the other portion, and the surface layer having a coefficient of thermal expansion which is smaller than that of the body of the one portion is disposed on the surface of the body of the one portion. Even when the temperature of the bearing device is changed, therefore, influence of thermal expansion of the body having a larger coefficient of thermal expansion is suppressed or relaxed by the surface layer having a smaller coefficient of thermal expansion. Consequently, variation due to heat in the gap between the supporting portion and the supported portion can be reduced. As a result, even when the temperature is changed, the bearing performance is not lowered.

The bearing device of the invention is characterized in that a bearing surface of at least one of the supporting portion and the supported portion has dynamic pressure generating grooves.

The bearing device of the invention is a dynamic pressure bearing device. In such a dynamic pressure bearing device, the distance between the supporting portion and the supported portion largely affects the generated dynamic pressure. However, variation due to thermal expansion in the distance between the supporting portion and the supported portion is suppressed by the surface layer. Therefore, the supporting performance due to the dynamic pressure of the dynamic pressure bearing device is less changed by a temperature change.

The bearing device of the invention is characterized in that the supported portion is made of stainless alloyed steel, the body of the supporting portion is made of a copper alloy, and the surface layer is a nickel plated layer.

In the bearing device of the invention, even when the temperature of the bearing device is changed, influence of thermal expansion of the body of the supporting portion which is made of a copper alloy having a larger coefficient of thermal expansion is suppressed or relaxed by the nickel plated layer having a smaller coefficient of thermal expansion. Therefore, variation due to a temperature change in the gap between the supporting portion and the supported portion can be reduced. As a result, even when the temperature is changed, the performance of the bearing device is stable.

The bearing device of the invention is characterized in that the surface layer covers the whole of the surface of the body.

In the bearing device of the invention, since the whole of the surface of the body having a larger coefficient of thermal expansion is covered by the surface having a smaller coefficient of thermal expansion, thermal expansion of the body is suppressed or reduced by the surface layer. In the bearing device, even when the temperature is changed, therefore, the gap between the supporting portion and the supported portion is hardly varied. Consequently, it is possible to obtain a bearing device which is highly resistant to a temperature change.

DETAILED DESCRIPTION OF THE PREFERRED EMBODIMENTS

Hereinafter, preferred specific embodiments of the invention will be described with reference to the accompanying drawings.

Figure 1:
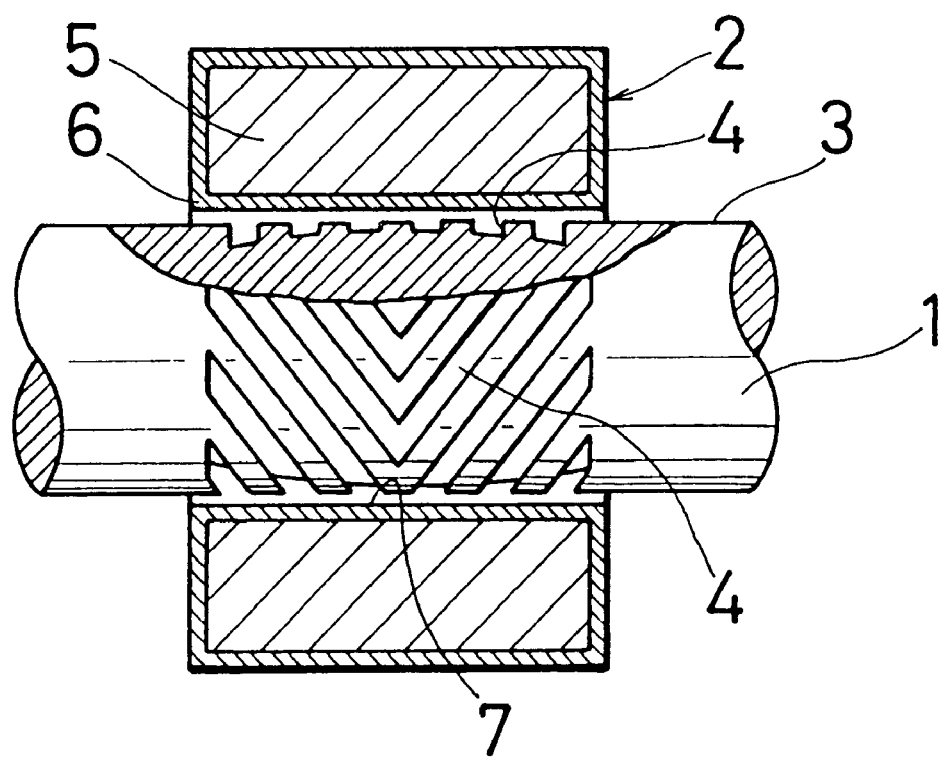
FIG. 1 is a section view of a dynamic pressure bearing device which is an embodiment of the invention.

As shown in FIG. 1, the bearing device comprises a shaft 1 serving as a supported member, and a sleeve 2 serving as a supporting member. The shaft 1 is made of stainless alloyed steel and is provided with dynamic pressure generating grooves 4 of a herringbone-like shape. On the other hand, the sleeve 2 consists of the body 5 made of a copper alloy, and an electroless nickel (Ni) plated layer 6 serving as a surface layer which covers the whole surface of the body 5. The electroless nickel plated layer 6 has a coefficient of thermal expansion which is smaller than that of the body 5 made of a copper alloy. The coefficient of thermal expansion of the shaft 1 made of stainless alloyed steel is smaller than that of the body 5 of the sleeve 2.

In the thus configured dynamic pressure bearing device, when the temperature is raised, the gap between the inner peripheral face 7 of the sleeve 2 and the outer peripheral face 3 of the shaft 1 is disposed to be increased because the coefficient of thermal expansion of the body 5 of the sleeve 2 made of a copper alloy is larger than that of the shaft 1 made of stainless alloyed steel. However, the electroless nickel plated layer 6 is disposed over the whole surface of the body 5 of the sleeve 2 and the coefficient of thermal expansion of the electroless nickel plated layer 6 is smaller than that of the body 5 of the sleeve 2, so that the amount of thermal expansion of the body 5 is strongly suppressed by the electroless nickel plated layer 6 covering the whole surface of the body 5, whereby the expansion amount of the inner peripheral face 7 of the sleeve 2 is reduced. Even when the temperature is raised, therefore, it is possible to efficiently suppress the increase of the gap between the inner peripheral face 7 of the sleeve 2 and the outer peripheral face 3 of the shaft 1. In the bearing device, even when the temperature is raised, therefore, a desired dynamic pressure can be generated, and changes in rigidity and torque are small, i.e., the performance is less changed.

Figure 2:
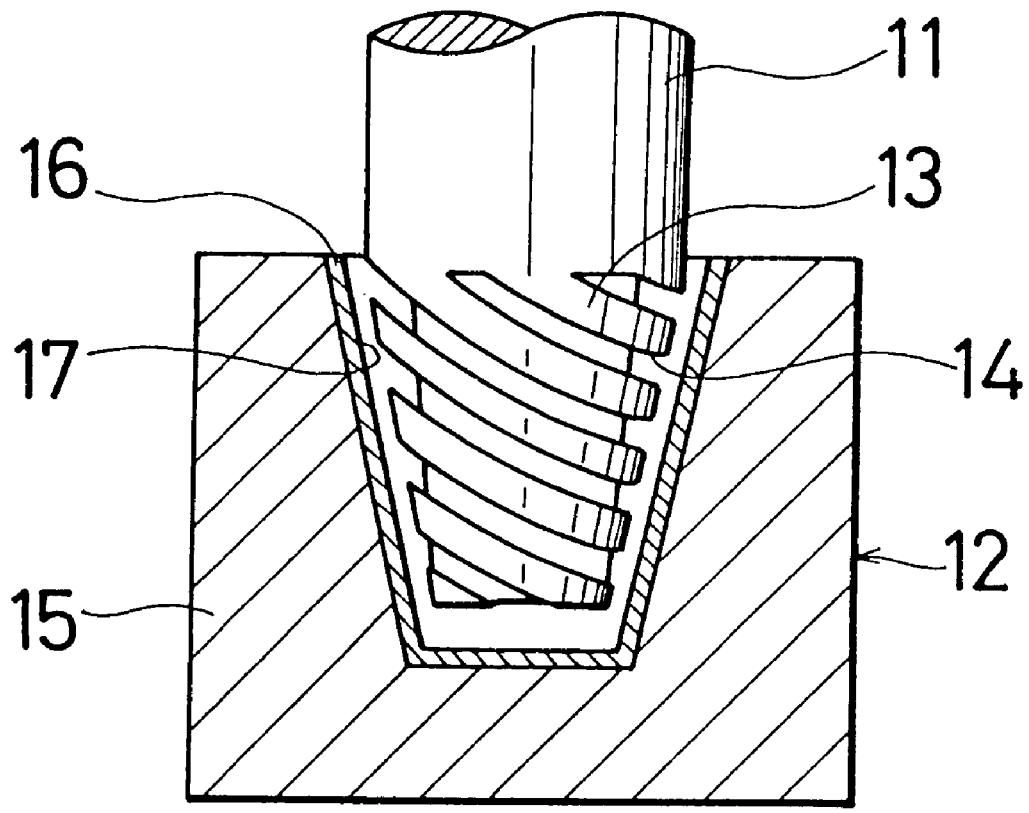
FIG. 2 is a section view of a dynamic pressure bearing device which is another embodiment of the invention.

FIG. 2 shows another embodiment. The dynamic pressure bearing device shown in FIG. 2 comprises a shaft 11 in which one end has a truncated conical shape, and a shaft receiving portion 12 into which the one end of the shaft 11 is fitted. The shaft 11 is made of stainless alloyed steel. Spiral dynamic pressure grooves 14 are formed in the surface of a truncated conical portion 13 of the shaft 11. On the other hand, the shaft receiving portion 12 consists of the body 15 made of a copper alloy, and an electroless nickel plated layer 16 serving as a surface layer covering the inner face of a truncated conical recess which is formed in the body 15. The electroless nickel plated layer 16 has a coefficient of thermal expansion which is smaller than that of the body 15 made of a copper alloy. The coefficient of thermal expansion of the shaft 11 made of stainless alloyed steel is smaller than that of the body 15 of the shaft receiving portion 12.

In the thus configured dynamic pressure bearing device, when the temperature is raised, the gap between the inner peripheral face 17 of the shaft receiving portion 12 and the outer peripheral face 13 of the shaft 11 is disposed to be increased because the coefficient of thermal expansion of the body 15 of the sleeve 12 made of a copper alloy is larger than that of the shaft 11 made of stainless alloyed steel. However, the electroless nickel plated layer 16 is formed on the inner face of the recess of the body 15 of the shaft receiving portion 12 and the coefficient of thermal expansion of the electroless nickel plated layer 16 is smaller than that of the body 15 of the shaft receiving portion 12, so that the amount of thermal expansion of the body 15 is suppressed by the electroless nickel plated layer 16, whereby the expansion amount of the inner peripheral face 17 of the shaft receiving portion 12 is reduced. Even when the temperature is raised, therefore, it is possible to suppress the increase of the gap between the truncated conical outer peripheral face 13 of the shaft 11 and the inner peripheral face 17 of the shaft receiving portion 12. In the bearing device, even when the temperature is raised, therefore, a desired dynamic pressure can be generated, and changes in rigidity and torque are small, i.e., the performance is less changed.

Furthermore, the electroless nickel plated layer 16 is excellent in strength and has resistance to wear, and hence the bearing surface is hardly injured.

In the embodiments, the electroless nickel plated layer serving as the surface layer having a smaller coefficient of thermal expansion is disposed on the whole face of the body of the sleeve, or the inner face of the recess of the body of the shaft receiving portion. The sleeve and the shaft receiving portion are made of a copper alloy having a larger coefficient of thermal expansion. As the surface layer, a layer which is made of a material other than nickel plating may be used as far as the layer is smaller in coefficient of thermal expansion than the body. It is a matter of course that the materials of the sleeve, the shaft, and the shaft receiving portion are not restricted to those used in the embodiments.

In the embodiments, the bearing device is a dynamic pressure bearing device having herringbone-like or spiral dynamic pressure grooves. The bearing device may be a dynamic pressure bearing device of any type as far as the supported portion and the supporting portion have different coefficients of thermal expansion. When the coefficient of thermal expansion of the shaft is larger than that of the sleeve, a surface layer having a coefficient of thermal expansion which is smaller than that of the body of the shaft is disposed on the body.

In the embodiments, the bearing device is a dynamic pressure bearing device. As far as the supporting portion and the supported portion have different coefficients of thermal expansion, the invention may be applied also to a sliding bearing device or a rolling bearing device.

The surface layer for suppressing the coefficient of thermal expansion may be formed only on the bearing surface.

As apparent from the above description, in the bearing device of the invention, the coefficient of thermal expansion of the body of one of the supporting portion and the supported portion is larger than that of the other portion, and a surface layer having a coefficient of thermal expansion which is smaller than that of the body of the one portion is disposed on the surface of the body. Even when the temperature of the bearing device is changed, therefore, influence of thermal expansion of the body having a larger coefficient of thermal expansion is suppressed or relaxed by the surface layer having a smaller coefficient of thermal expansion. Consequently, variation due to heat in the gap between the supporting portion and the supported portion can be reduced, and the change by heat in the performance of the bearing can be reduced.

In the bearing device of the invention, variation due to thermal expansion in the gap between the supporting portion and the supported portion is suppressed by the surface layer. Therefore, the change by a temperature change in the supporting performance due to a dynamic pressure of the dynamic pressure bearing device can be reduced.

In the bearing device of the invention, even when the temperature of the bearing device is changed, influence of thermal expansion of the body of the supporting portion which is made of a copper alloy having a larger coefficient of thermal expansion is suppressed or relaxed by the nickel plated layer having a smaller coefficient of thermal expansion. Therefore, variation due to a temperature change in the gap between the supporting portion and the supported portion can be reduced, and the performance of the bearing device can be stabilized.

In the bearing device of the invention, the whole of the surface of the body having a larger coefficient of thermal expansion is covered by the surface layer having a smaller coefficient of thermal expansion, and hence thermal expansion of the body is strongly suppressed or reduced by the surface layer. In the bearing device, even when the temperature is changed, therefore, the gap between the supporting portion and the supported portion is hardly varied. Consequently, it is possible to obtain a bearing device which is highly resistant to a temperature change.

What is claimed is:

1. A bearing device in which a supporting portion and a supported portion are rotatably fitted to each other, wherein said supporting portion has a surface layer on a surface of a body thereof, said surface layer having a coefficient of thermal expansion which is smaller than the coefficient of thermal expansion of said body, and the coefficient of thermal expansion of said body is larger than the coefficient of thermal expansion of said supported portion, and wherein said supported portion is made of stainless alloyed steel, said body of said supporting portion is made of a copper alloy, and said surface layer is a nickel plated layer.

2. A bearing device in which a supporting portion and a supported portion are rotatably fitted to each other, wherein said supporting portion has a surface layer on a surface of a body thereof, said surface layer having a coefficient of thermal expansion which is smaller than the coefficient of thermal expansion of said body, and the coefficient of thermal expansion of said body is larger than the coefficient of thermal expansion of said supported portion, wherein a bearing surface of at least one of said supporting portion and said supported portion has dynamic pressure generating grooves, and wherein said supported portion is made of stainless alloyed steel, said body of said supporting portion is made of a copper alloy, and said surface layer is a nickel plated layer.

* * * * *